United States Patent [19]

Webster et al.

[11] Patent Number: 5,504,909
[45] Date of Patent: Apr. 2, 1996

[54] POWER MANAGEMENT APPARATUS COLLOCATED ON THE SAME INTEGRATED CIRCUIT AS THE FUNCTIONAL UNIT THAT IT MANAGES

[75] Inventors: Larry D. Webster, Dublin; Ehud Pardo, Santa Clara, both of Calif.

[73] Assignee: Electronics Products Company, Dublin, Calif.

[21] Appl. No.: 185,185

[22] Filed: Jan. 21, 1994

[51] Int. Cl.$^6$ .............................. G06F 15/00; G06F 11/30
[52] U.S. Cl. ............................................................. 395/750
[58] Field of Search ................................................ 395/750

[56] References Cited

U.S. PATENT DOCUMENTS

| | | | |
|---|---|---|---|
| 4,698,748 | 10/1987 | Juzswik et al. | 395/750 |
| 4,747,041 | 5/1988 | Engel et al. | 395/750 |
| 4,952,817 | 8/1990 | Bolan et al. | 307/39 |
| 5,167,024 | 11/1992 | Smith et al. | 395/375 |
| 5,300,831 | 4/1994 | Pham et al. | 326/44 |

*Primary Examiner*—Jack B. Harvey
*Assistant Examiner*—Jeffrey K. Seto

[57] ABSTRACT

A power management apparatus that controls the use of power within an integrated circuit. A first embodiment gates integrated circuit power on or off concurrently with switches inserted between the co-resident functional circuit I/O nets and the integrated circuit I/O pads. A second embodiment instantiates the power management apparatus on an integrated circuit by itself for connection to external integrated circuits. Buffering or sequencing is provided for both embodiments.

3 Claims, 7 Drawing Sheets

POWER MANAGEMENT APPARATUS COLLOCATED ON THE SAME INTEGRATED CIRCUIT AS THE FUNCTIONAL UNIT THAT IT MANAGES

FIELD OF INVENTION

This invention relates to the management of electrical power consumption in individual integrated circuits.

The invention is particularly useful, though not exclusively applicable, to any electronic device that can employ more than one rate of power consumption, and where control of the total power used by the electronic device is desirable.

BACKGROUND OF THE INVENTION

The management of the use of electric power within an electronic device has become extremely important. A device for electric power management as disclosed by Pardo/Webster in "Power Control Sequencer for Low Power and Battery Powered Applications," patent application Ser. No. 08/099,942, Jul. 30, 1993 generally:

1) determines when a function within an electronic device is idle,
2) saves pertinent information relative to the state of that function,
3) removes the power from those components that support the function,
4) determines when the function is to be reactivated,
5) reapplies power to the powered down components associated with the powered down function, and
6) restores the function to a defined state.

The principal advantages of the Power Control Sequencer (PCS) for management of electrical power over other methods is:

1) power is completely removed from functional circuits which are performing no useful function, and
2) the PCS is intended for rapid, dynamic allocation of power within the electronic device.

Even small amounts of instantaneous power used consistently over a long period of time can added up to a significant amount of total power used. If a functional circuit is completely powered-down, it uses no power for the time it is "off," regardless of the length of that time. The functions considered by Pardo/Webster generally consists of a block of circuitry involving several to many integrated circuits or other electronic devices. Though possible, the management of many, single integrated circuits or other electronic devices on an individual basis was not generally envisioned by Pardo/Webster as practical.

A PCS is designed from several basic building blocks. These are the Controller, Power Gate, Initializer, Memory, Monitor, and Buffer. The design of a PCS is implemented by the circuit designer at the system, subsystem and assembly (printed circuit board) level using the basic PCS building blocks. In a typical PCS design, one or more "power gates" control the actual application of power to a given functional circuit, usually implemented over several to many integrated circuits. Power management is usually instantiated at the printed circuit board level. Although PCS devices can be adequately constructed using available technology, these devices can possess one or more undesirable characteristics which can be mitigated through the use of the present invention. The undesirable characteristics of a PCS device implemented using present technology are:

1) The power of an entire electronic device is managed by dividing the power supply circuit into power management sections. Because of physical design constraints, each section is usually defined to be an assembly or printed circuit board, or sections of a printed circuit board involving several integrated circuits. These power management sections can involve electronic device functions such as disk control, I/O control, memory management, etc. Power is applied and removed from each power management section by a "power gate," which is usually a electronically controlled power switch or a voltage regulator containing the electronic switch. Power management of more than one function on a single printed circuit board requires the designer to segment the printed circuit board's power plane into as many sections as there are functions to manage. This can lead to unwanted complexities in the routing of the printed circuit board and associated wiring, and usually precludes the power management of small functions involving one to a few integrated circuits.

2) When power is applied to the printed circuit board's power plane, power filtering capacitors are usually present in the power circuit and are therefore charged. Removal of power in the power management process causes the capacitors to discharge, thus wasting the power used to charge them. This loss of power can be significant in applications where the "power-off" time is less than a few seconds. Loss of power to capacitive discharge/recharge decreases the efficiency and therefore the power savings available to an electronic device utilizing a PCS device which manages functions requiring rapid power cycling.

3) Power managed on a power plane containing capacitance cannot be rapidly restored when compared to the nanosecond operation of today's electronics. Resistance and inductance in the routing back to the power supply coupled with the power plane capacitance constrains the power-up time of the power plane. This will limit the applicability of the PCS.

4) Cycling of power on a printed circuit board or electronic device's power plane which contains discrete components, such as Tantalum capacitors, is not viewed as a reliable practice.

5) Electrical isolation of PCS "powered-off" functions from "powered-on" functions is provided by a "buffer." As the complexity and number of the functions controlled increase, the complexity of the buffer also increases. The complexity of the buffer can become cumbersome to the designer. The buffer can also consume an inordinate amount of power which is contrary to the Power Control Sequencer concept.

It would be desirable if present integrated circuit technology provided certain key power management features as built-in functions in order to obviate the currently defined PCS undesirable characteristics. Providing these features as built-in integrated circuit functions would also relieve the designer of having to understand and provide these functions when they are used in power management. Integrating these functions into individual integrated circuits will allow power management to extend down to the individual integrated circuit.

The present invention creates a "Power Management Apparatus (PMA)" for integrated circuits. The PMA is defined herein having several embodiments and several variations for each embodiment. The PMA combines several electronic "means" in unique ways to perform power management. The PMA draws from the PCS, recombining and reordering two of the PCS building blocks. A PMA incorporates the PCS function of "power gate means" and defines it specifically to be a "power switching means." A PMA also incorporates the PCS concept of "buffer means," but changes its function to the more suitable, and simpler "signal switching means." Instead of "buffering," the PMA uses "signal switching" to achieve the same effect: isolation of powered-on circuitry from powered-off circuitry. "Power switching means" and " signal switching means" are combined with and without functional circuits on integrated circuits which contain PMA. These new integrated circuits are further combined into chip and socket means to create new chip, and active circuit socket power management families.

The various embodiments of the PMA provide the designer with design tools from which power management can be more easily accomplished relative to the prior art. Using the PMA, power management can be accomplished at the individual integrated circuit level. Electronic devices designed using the PMA are simpler to generate, manufacture, and test. They would have a wider range of usefulness and would also be more reliable relative to a PCS designed into the same equipment. Most importantly, significant amounts of power can be saved in electronic devices which use the PMA relative to the current state-of-the-art. The inventors firmly believe that this novel device cannot be found anywhere in existing technology.

Definition of Terms low impedance—generally less than 5 ohms. The exact limiting value required is a function of the impedance of associated circuitry.

high impedance—generally greater than 10 megohms. The exact limiting value required is a function of the impedance of associated circuitry.

asserted state—A logical term implying that a logical function is true or valid. As used herein, when the control input of a power gate is in the asserted state, the power gate presents a low impedance from the power gate power input to the power gate power output. Also, as used herein, when the control input of an I/O switch is in the asserted state, the I/O switch presents a low impedance from the I/O switch signal input to the I/O switch signal output. Action caused by the assertion of the control input of a sequencer signal input is defined where used.

deasserted state—A logical term implying that a logical function is false or invalid. As used herein, when the control input of a power gate is in the deasscrted state, the power gate presents a high impedance from the power gate power input to the power gate power output. Also, as used herein, when the control input of an I/O switch is in the deasserted state, the I/O switch presents a high impedance from the I/O switch signal input to the I/O switch signal output. Action caused by the deassertion of the control input of a sequencer signal input is defined where used.

power source—a means from which electric power may be drawn.

power gate—a power switching means used herein for making or breaking a connection between a power source and its load on command, implemented as an electrically controllable electronic switch. A power gate consists of three terminals: a control input terminal, a power input terminal, and a power output terminal. When the control input terminal is asserted, the power gate causes a low impedance to be presented between the power input terminal and the power output terminal. When the control input terminal is aleasserted, the power gate causes a high impedance to be presented between the power input terminal and the power output terminal. A power gate differs from an I/O switch in that it is capable of transferring a specified amount a power from its power input terminal to its power output terminal with a specified efficiency.

I/O switch—an electronically controllable electronic signal switching means used herein for isolating a powered-on circuit from a powered-off circuit. An I/O switch consists of three terminals: a control input terminal, a signal input terminal, and a signal output terminal. When the control input terminal is asserted, the I/O switch causes a low impedance to be presented between the signal input terminal and the signal output terminal. When the control input terminal is deasserted, the I/O switch causes a high impedance to be presented between the signal input terminal and the signal output terminal. An I/0 switch differs from a power gate in that it is required to transport a signal from its signal input to its signal output with specified fidelity.

buffer—a two terminal means for transferring a signal from the buffer's signal input terminal to the buffer's signal output terminal. The buffer's input terminal presents defined characteristics to external electronic devices. In the case of the present invention, the buffer output terminal is capable of driving all of the loads presented by the power gate and I/0 switch control input terminals to which it is connected.

functional circuit—a means for performing a specified electronic function or group of electronic functions.

integrated circuit substrate—a means within or on which electronic components can be constructed and interconnected to form a functional circuit.

integrated circuit—a complex of electronic components and their connections that is produced in or on an integrated circuit substrate.

chip—a means for mechanically supporting an integrated circuit and electrical connecting pins, containing a connection means for connecting the integrated circuit to the electrical connecting pins.

socket—a connection means for connecting chip pins to a printed circuit board.

connector—a means for the connection of electronic signals from one physical device to another physical device.

pad—an area of an integrated circuit substrate for bonding a connection wire or other connection means onto the integrated circuit substrate.

net—a connection means for connecting selected electronic component terminals in or on an integrated circuit substrate together in a defined manner.

I/0—A switch, net or pad serving the electronic function of input, or output, or input and output concurrently.

electrical signal—a time variant voltage, as compared to a reference, which exists at a point of interest in an electric circuit.

connection means—a means for transporting an electrical signal or signals from one point in an electric circuit to another.

pwr—An acronym for the word "power."

Note to the examiner: we have elected to use the defined jargon of "power gate" and "I/0 switch" in order to constantly remind the reader that, even though both devices can be fundamentally reduced to a "switching means," the use and specifications of a power switch are radically different from those of an I/O switch. They could not be interchanged in a PMA. They are in fact different devices, and we, therefore, give them different names.

OBJECTS AND ADVANTAGES

The PMA provides two practical embodiments for implementing system-level power management by controlling the power in individual integrated circuits. The first embodiment combines the several "means" used by the PMA: power gate, I/O switches, functional circuit, and integrated circuit in a novel manner. The second embodiment creates several new integrated circuits by removing the functional circuit from the first embodiment. These new integrated circuits are further combined with other means to create chips and sockets. Combinations creating the latter produce "active circuit" socket PMAs.

OBJECTS OF THE FIRST EMBODIMENT

Accordingly, it is a first object of the first embodiment of the present invention to add one or more "power gate" functions to the functional circuit contained on the substrate of any existing or to-be-developed integrated circuit. The power gates collectively control the use of power within the integrated circuit's substrate.

It is a second object of the first embodiment of the present invention to add an "I/0 switch" function to one or more input, output, or concurrent input and output functions used by a functional circuit contained on the substrate of any existing or to-be-developed integrated circuit. The I/0 switch provides for the connection and isolation of functional circuit nets to/from the integrated circuit's I/0 pads and, thereby protects the integrated circuit substrate from externally induced latch-up.

It is a third object of the first embodiment is to provide for the buffering of the control inputs of the power gates and I/0 switches from external circuitry.

It is a fourth object of the first embodiment is to provide for control of the internal control signal timing of the power gates and I/0 switches to insure that the integrated circuit's inputs and outputs are isolated from external circuitry during transitions of power on the integrated circuit's power nets.

In the first embodiment, a completely new family of integrated circuits is defined composed of a combination of power gates, I/O switches, an integrated circuit substrate and a functional circuit. Electronic devices which use members of this family will be able to effectively control their use of electrical power. Management of electrical power use is of prime concern to the United States, and generally falls under the umbrella of ecology. We propose to refer to the new family of integrated circuits as the "green" family in deference to their ecological background.

OBJECTS OF THE SECOND EMBODIMENT

It is a first object of the second embodiment of the present invention to define a new integrated circuit type which combines the means of "power gate," "I/O switch," and integrated circuit substrate which function as in the first embodiment, but with the functional circuit removed and located in an external chip.

It is a second object of the second embodiment to provide for the buffering of the control inputs of the power gates and I/O switches from external circuitry.

It is a third object of the second embodiment is to provide for control of the internal control signal timing of the power gates and I/O switches to insure that the integrated circuit's inputs and outputs are isolated from external circuitry during transitions of power on external circuit power nets.

It is an fourth object of the second embodiment of the present invention to define a new type of integrated circuit socket which contains the integrated functions of "power gate" and "I/O switch." This socket serves as an under-chip mounting facility which contains built-in power gate and the buffer circuit functions installed between the chip and the printed circuit board or other circuitry with which the chip is operated. The socket itself contains an integrated circuit containing the PMA.

ADVANTAGES

Both embodiments give the designer control of the application of power within any individual integrated circuit, thereby allowing the designer to locate power-controlled devices anywhere in the physical design. Devices do not need to be collocated and constrained to a particular power plane. Power control is commanded via a single control signal which is routed to each integrated circuit as is any other electronic signal. When power is removed from an integrated circuit, the power supply and power plane may remain powered-on. No power loss to capacitive discharge occurs. Power system reliability remains unaffected. As there is very little capacitance within the power gate-to-integrated circuit internal power plane routing, recovery time is very short when power is reapplied. Most importantly, the designer can provide power management functions within an electronic device using PMA technology without the need to uniquely and specifically design a "buffer." It will be a built-in feature of PMA integrated circuits.

Both embodiments offer different and powerful power management advantages to the circuit designer:

The first embodiment is seen as the long term solution to practical power management: a family of integrated circuits possessing many of the functions found in today's technology are created which contain the PMA functionality. New ASIC designs could directly incorporate the PMA.

The second embodiment provides the PMA integrated into a integrated circuit separate from the functional circuit. The second embodiment allows an ease of design similar to the first embodiment, but this second embodiment can be used with existing technology. In the second embodiment, the new integrated circuit is "wired-up" between the integrated circuit to be power-managed and its external circuitry.

The second embodiment allows existing integrated circuits to be mounted under-chip onto a socket containing a PMA integrated circuit providing power gate and I/O switch features. This combination of socket means and a PMA integrated circuit can be used with existing technology.

The first embodiment represents an internal solution, the second embodiment represents and external solution, either a tandem mounted or under-chip socket mounted.

Incorporation of key power management functions into an integrated package, either incorporated into the substrate with a functional circuit, or incorporated into a separate chip or socket, allows the designer to control both the power to the functional circuit and its connection to external circuitry simultaneously through the manipulation of a single control input. This ability of the invention to provide single input control is a powerful design advantage. When the single control input is asserted, power is applied to the functional circuit and all of its input and output nets are connected through a low impedance signal switch to external circuitry: the functional circuit is functioning nominally in-circuit. When the single control input is deasserted, power is removed from the functional circuit and all input and output nets are isolated from external circuitry by a high impedance switch: the functional circuit essentially disappears, in the electrical sense, from the circuit in which it was previously connected and functioning.

A second advantage of this electrical "disappearance" or disconnection of a functional circuit from external circuitry is to allow electrical busses and other external circuits to have an excess number of electrical loads connected to them. Power to the number of functional circuits which present loads exceeding the specified load limit is removed by the PMA, thereby electrically removing them from the circuit. A controller controls power to all functional circuits through PMA devices and keeps the number of powered-up functional circuits below the design limit. Functional circuits can be powered-up or powered-down consistent with the needs of the electronic device and the load limit of the bus or other circuitry.

SUMMARY OF THE INVENTION

The present invention controls the rate of power consumption in any individual integrated circuit through one of two embodiments:

Embodiment #1

Figure 2:
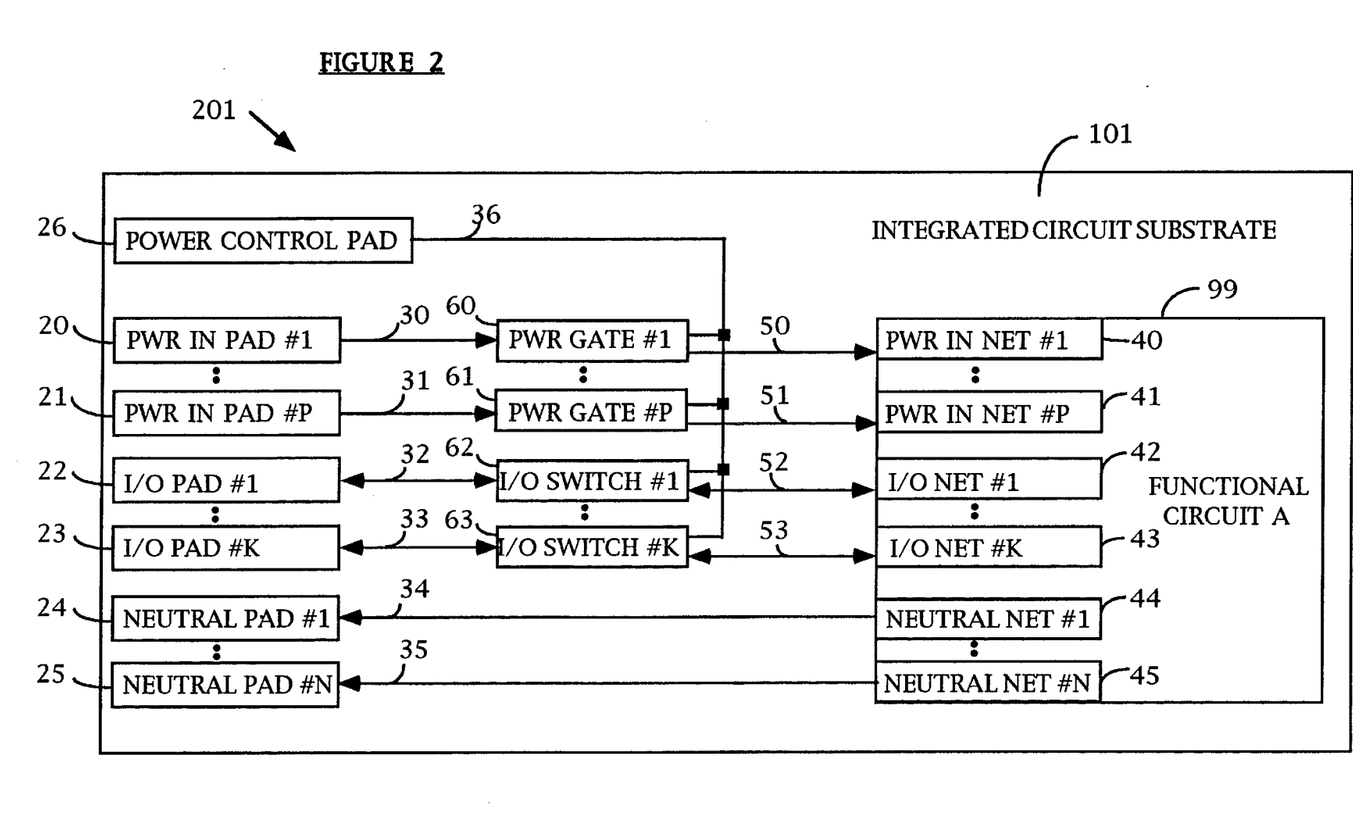
FIG. 2 shows a power gate means, combined with a I/O switch means, a functional circuit, and an integrated circuit substrate to form the first variation of the first embodiment of the PMA.
Figure 3:
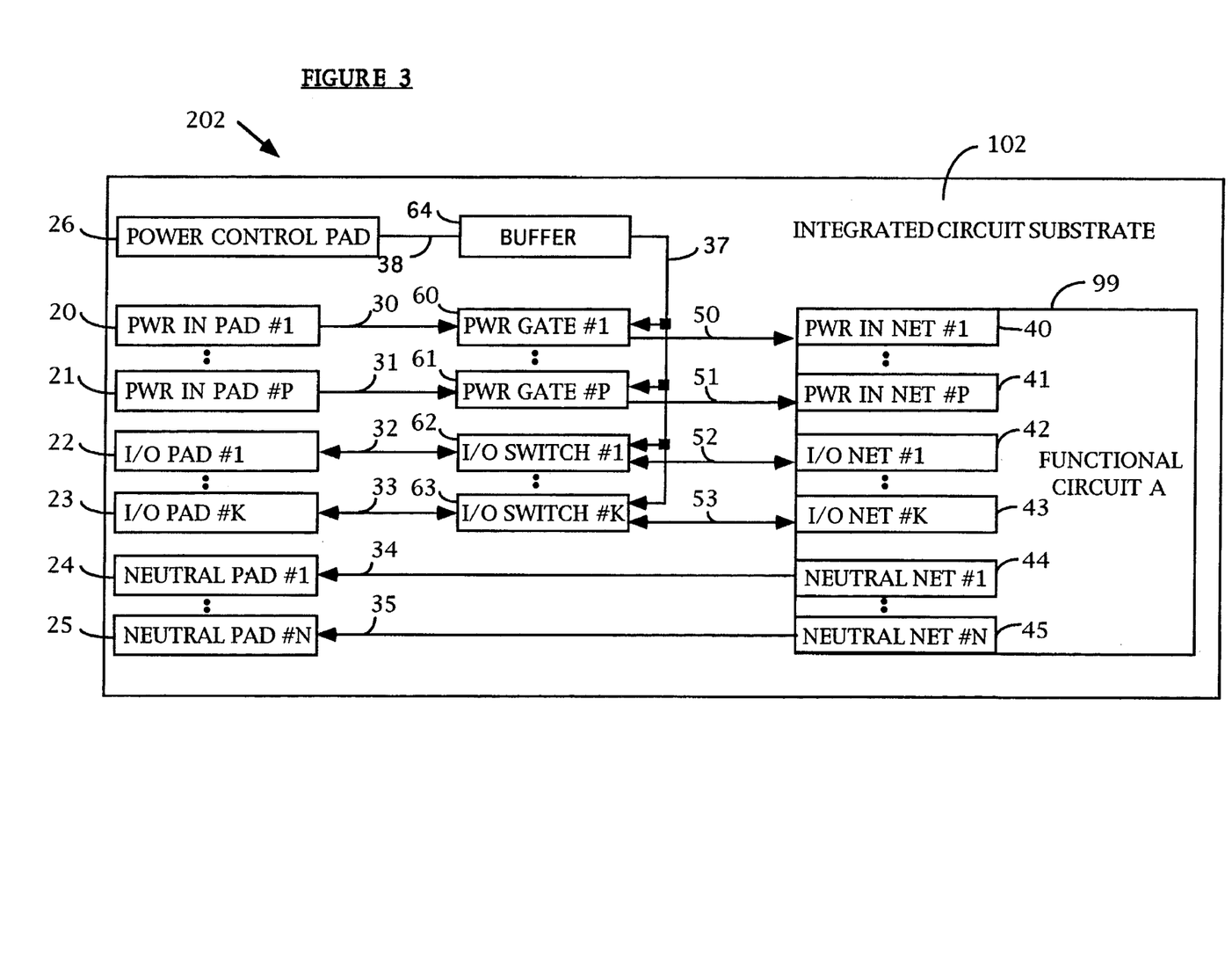
FIG. 3 shows a power gate means, combined with a I/O switch means, a buffer means, a functional circuit, and an integrated circuit substrate to form the second variation of the first embodiment of the PMA.
Figure 4:
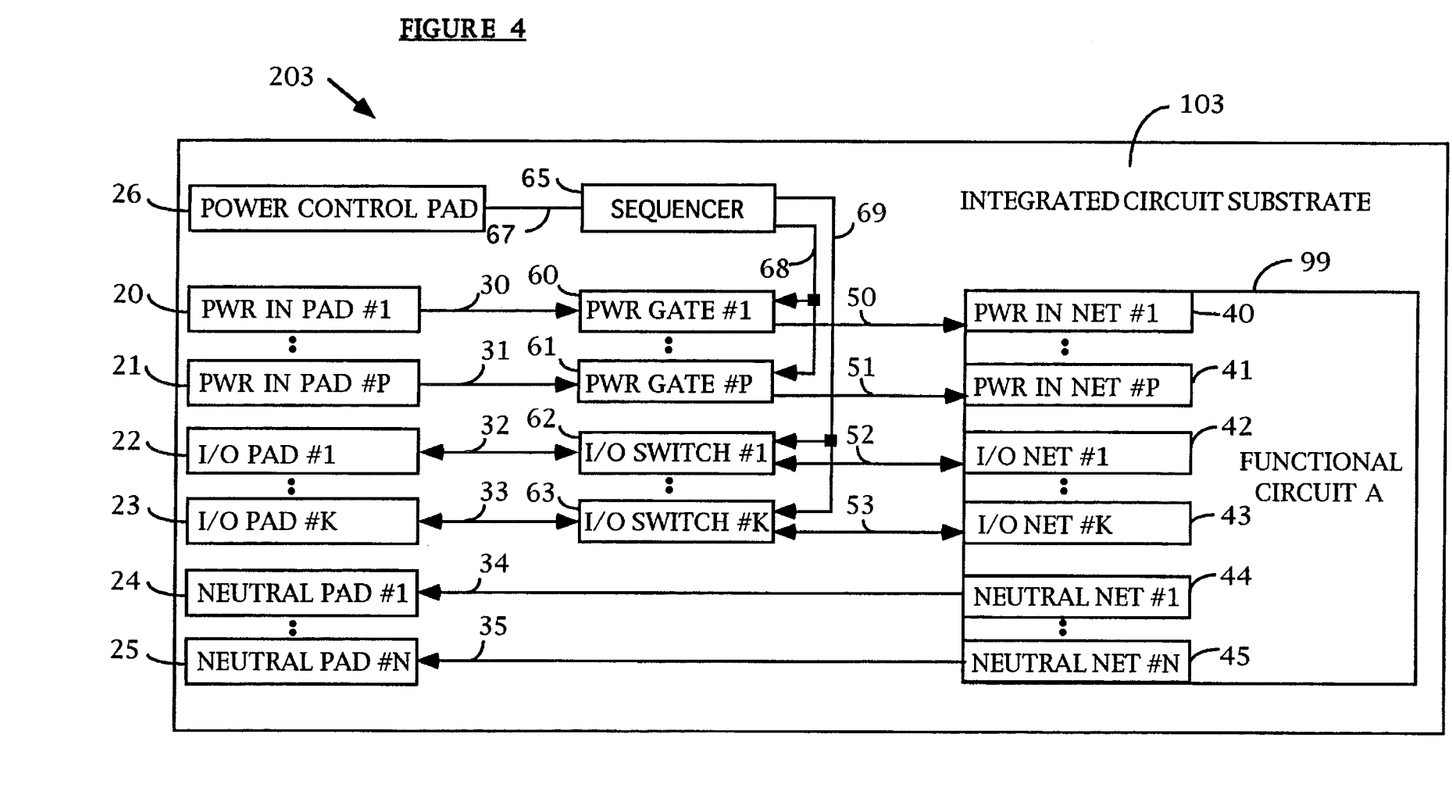
FIG. 4 shows a power gate means, combined with a I/O switch means, a sequencer means, a functional circuit, and an integrated circuit substrate to form the third variation of the first embodiment of the PMA.

The integrated circuit substrate containing an existing or to-be-developed functional circuit is modified by:

a) adding one or more "power gate" functions to the integrated circuit substrate as depicted in FIGS. 2–4. The power gate(s), which serves the function of an electrically controllable power switch, is inserted between the power source input pad(s) and the integrated circuit's substrate power net(s) for that power type. The power gate(s) controls the distribution of power on the integrated circuit's substrate, and/or b) adding one or more "I/O switch" functions to an integrated circuit substrate possessing a functional circuit as depicted in FIGS. 2–4. The I/O switch(s) is inserted between an I/0 pad and the integrated circuit substrate I/0 net for a given signal. The I/O switch serves as an electrically controllable signal switch between the two points. The I/O switch causes a low impedance connection between the I/0 pad and the I/O net when its control input terminal is asserted. The I/O switch causes a high impedance to exist between the I/0 pad and the I/O net when its control input terminal is deasserted. The I/O switch first protects the integrated circuit against externally induced latch-up, and second provides for the effective electrical isolation of the I/0 net from external circuitry, c) the state of the I/O switch and the power gate are controlled at their control input terminals by:
1) a single input electrical signal, or,
2) a single, internally buffered input electrical signal, or,
3) two individually time sequenced electrical signals which are themselves driven from a single input electrical signal.

Embodiment #2

A new type of PMA integrated circuit is defined which contains the integrated functions of "power gate" and "I/O switch" controlled by a single input signal. Each power gate used is an electrically controllable power switch which is used to control the transport of electrical power from an input pin to an output pin. Each I/O switch used serves as an electrically controllable signal switch between an input pin and an output pin.

The state of the I/O switch and the power gate are controlled at their control input terminals by:
1) a single electrical signal, or,
2) a single, internally buffered electrical signal, or,
3) two individually time sequenced electrical signals which are themselves driven from a single electrical signal.

The integrated circuit is combined with pin and connection means to create PMA chips, and with sockets to create active PMA sockets.

DESCRIPTION OF THE INVENTION

Applicability

The first embodiment of the present invention is applicable to most types of analog or digital functional circuits and requires that a new integrated circuit substrate containing the present invention combined with a functional circuit be created. The second embodiment is usable in conjunction with most existing analog or digital technology.

General Remarks on Content

The Functional Circuit A 99 shown in FIGS. 1–4 may be part of a larger functional circuit residing on Integrated Circuits 200, 201, 202, or 203. It is acknowledged that some functions (not shown) may exist on these integrated circuits which do not require the use of the PMA. These would be otherwise shown grouped in a "Functional Circuit B" (not shown or numbered). In this event, there is no modification to that part of the integrated circuit substrate involved with Integrated Circuit B due to inclusion of the PMA as it relates to Functional Circuit A 99: that part of Integrated Circuit 20 1 thru Integrated Circuit 203 associated with Integrated Circuit B remains as it would have been without the present invention. This is considered a trivial rearrangement of the embodiments of the invention and is embraced but not specifically addressed herein.

Further, an integrated circuit may contain a functional circuit for which a part, the Functional Circuit A 99, is under power management and another part, which we refer to as Functional Circuit C, is not. It is an obvious extension of this invention to have signal connectivity between the Functional Circuit A 99 and Functional Circuit C wherein the PMA is used to manage the power within the Functional Circuit A 99, and the signals that pass between the Functional Circuit A 99 and Functional Circuit C are controlled by I/O switches. In this event, electrical signals do not necessarily pass through the integrated circuit substrate pads but can transition directly from the Functional Circuit A 99 nets, through an I/O switch to Functional Circuit C. This is considered a trivial rearrangement of the embodiments of the invention and is embraced but not specifically addressed herein.

Also, the power consumption of some functional circuits may be largely dependent on the signal impressed on one or more, but not all, of the integrated circuit I/O pads. For example, the clocking of a clock input of a CMOS chip can be the reason for substantially all of the power consumption within the device. A trivial reduction in configuration of the PMA can be created wherein only the clock input is modified with an I/O switch inserted between the clock I/O pad the clock I/O net. For this device, the number of power gates could be zero, and the number of I/O switches could be as few as one. Power consumption for an integrated circuit which has only a single input modified with an I/O switch could approach that of a fully configured PMA for the same integrated circuit. This is considered a trivial rearrangement of the embodiments of the invention and is embraced but not specifically addressed herein.

Conversely, a functional circuit could be created which, when no power is applied, does not adversely impact external circuitry, as defined by the designer using such a device. Such a functional circuit would not require the use of any I/O switches as an adjunct to the interface of the functional circuit. Using this functional circuit, another trivial reduction in the configuration of the PMA can be created wherein one or more power gates are inserted between the power input pads and the power input nets. For this device, the number of I/O switches could be zero, and the number of power gates could be as few as one. This is considered a trivial rearrangement of the embodiments of the invention and is embraced but not specifically addressed herein.

Also, an integrated circuit may contain two or more completely separate functional circuits on the same substrate, one or more of which have a PMA incorporated, and thus each separate functional circuit augmented with the PMA can be powered-up or powered-down independently. This is considered a trivial rearrangement of the embodiments of the invention and is embraced but not specifically addressed herein. Further, when using a sequencer for control of the time relationship between the power gate(s) and I/O switch(es), it may not always be desirable to have all of the I/O switch(es) coupled or uncoupled together. It may be advantageous to have one or more I/O switches transition with the power gates while other I/O switch(es) transition separately. This is considered a trivial rearrangement of the embodiments of the invention and is embraced but not specifically addressed herein.

Inclusion of all the possible combinations in this patent application that could contain the present invention, combined with unmodified functional circuits, or containing combinations which have zero members would unnecessarily expand this application and confuse understanding. These are included herein by reference as obvious extensions of the basic precepts of the invention.

Power and Neutral Terminals

Power and neutral terminals are required for all power gates, I/O switches, and buffers shown in any figure or described in the body of the text in this application. These terminals are not specifically shown or described. They are included herein by reference as obvious extensions of the basic precepts of the invention.

The Generic Integrated Circuit

Figure 1:
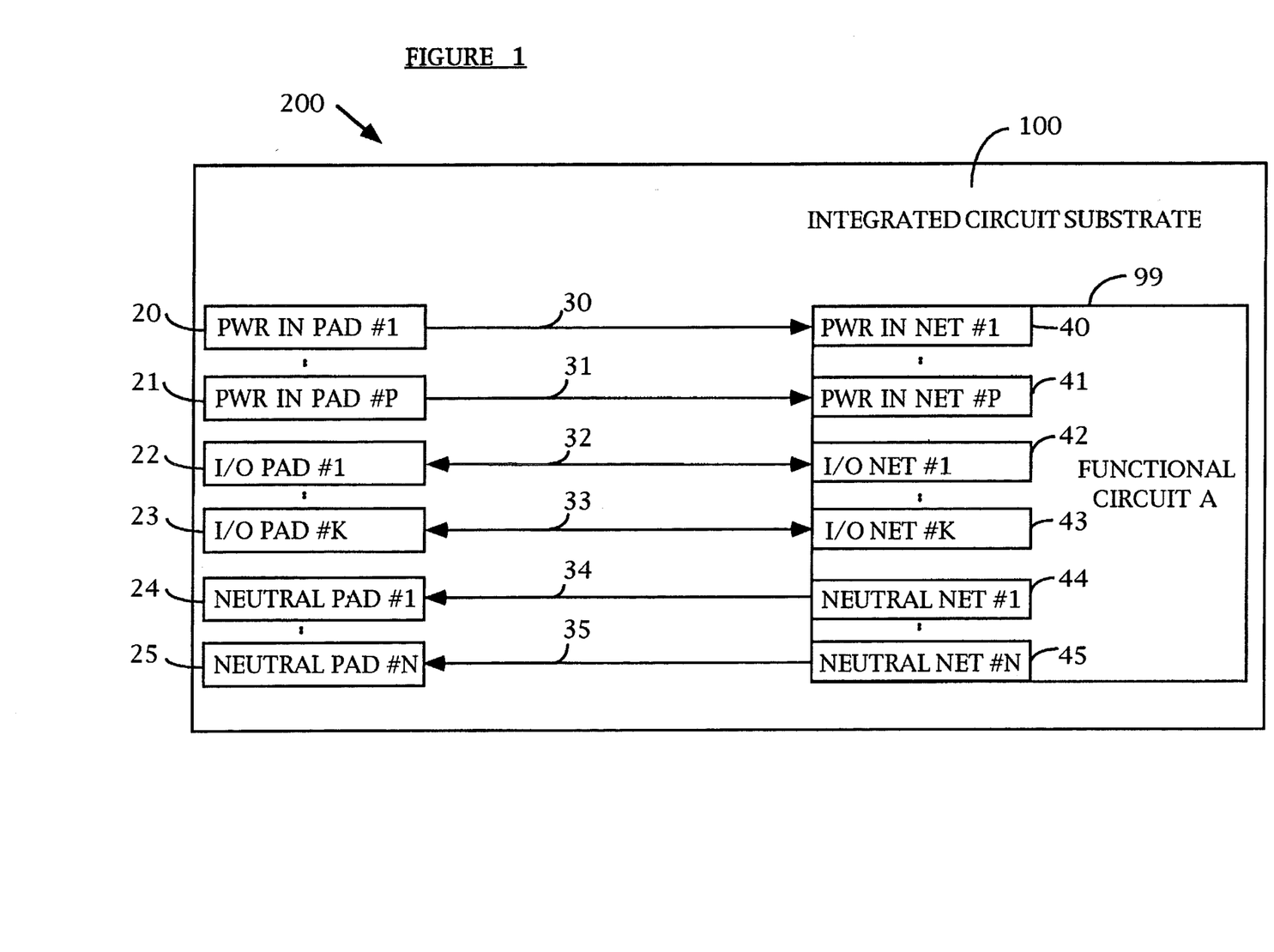
FIG. 1 shows a functional circuit and an integrated circuit substrate combined to form a "generic" integrated circuit.

FIG. 1 shows a Generic Integrated Circuit 200 without the present invention. The figure shows Functional Circuit A 99, which performs the electronic functions of the Generic Integrated Circuit, combined with Integrated Circuit Substrate 100. The interface of the Functional Circuit A 99 is generalized to consist of:

a) some number of power input nets "1" thru "P." These are shown as Power In Net #1 40 thru Power In Net #P 41 and represent all of the power input interfaces to Functional Circuit A 99. The exact number of power input nets is determined by the nature of the functions performed by Functional Circuit A 99 when the specific integrated circuit is designed. Power entering a power input net is distributed to a load in Functional Circuit A 99.

b) some number of input, output, or output/input signal nets "1" thru "K." These are shown as I/O Net #1 42 thru I/O Net #K 43 and represent all of the signal interfaces to Functional Circuit A 99. The exact number of input, output, or output/input signal nets is determined by the nature of the functions performed on by Functional Circuit A 99 when the specific integrated circuit is designed.

c) some number of neutral power return nets "1" thru "N." These are shown as Neutral Net #1 44 thru Neutral Net #N 45. The exact number of neutral power return nets is determined by the nature of the functions performed by Functional Circuit A 99 when the specific integrated circuit is designed.

Each Functional Circuit A 99 net is connected to a pad on the Integrated Circuit Substrate 100 via a connection means. These connections are shown as:

a) Power In Net #1 40 is connected to Power In Pad #1 40 via connection means 30.

b) Power In Net #P 41 is connected to Power In Pad #P 41 via connection means 31.

c) I/O Net #1 42 is connected to I/O Pad #1 42 via connection means 32.

d) I/O Net #K 43 is connected to I/O Pad #K 43 via connection means 33.

e) Neutral Net #1 44 is connected to Neutral Pad #1 44 via connection means 34.

f) Neutral Net #N 45 is connected to Neutral Pad #N 45 via connection means 35.

Power and signals are transported to/from the Functional Circuit A 99 nets to/from Integrated Circuit Substrate 100 pads usually located near the physical edges of Integrated Circuit Substrate 100. Power and signals are then usually transported from the Integrated Circuit Substrate 100 to/from connectors on an integrated circuit body (not shown) using a bonded connection means.

Operationally, power and signals are presented to the Integrated Circuit Substrate 100 through a connection means bonded, usually, to each pad (not shown). Power and signals are then directly transported to/from the pads to their associated nets within the Functional Circuit A 99. The Functional Circuit A 99 is then able to function as it was electrically and logically designed to function.

The construction and operation of any integrated circuit can be conceptually reduced to function with the set of power input, power return, input, output, and input/output nets as shown in FIG. 1.

First Embodiment of the Invention

Purpose of the First Embodiment

This first embodiment of the present invention combines power gates, I/O switches, buffer functions, an integrated circuit substrate and a functional circuit in various ways to create three new integrated circuits numbered 201, 202, and 203 in FIGS. 2–4 respectively. These embodiments control the power applied to the functional circuit within an integrated circuit and can connect and isolate the I/O nets of the functional circuit to/from external circuitry, thereby protecting the integrated circuit from latch-up. These three variations to this embodiment differ only by the means by which the power control signal is applied to the power gate and I/O switch control inputs.

First Variation of the First Embodiment
of the Invention

Construction of the First Variation of the First Embodiment

The first variation of the first embodiment of the present invention is shown in FIG. 2. The integrated circuit defined for Generic Integrated Circuit 200 is shown with power gate and I/O switch functions combined with it. The new integrated circuit thus created is shown as Integrated Circuit 201. Connection means 30, 31, 32, and 33, which connected the power and I/O pads to the functional circuit nets, shown in FIG. 1, have been removed.

Power In Pad #1 20 is connected to the power input of Power Gate #1 60 via connection means 30. The power output of Power Gate #1 60 is connected to Power In Net #1 40 via connection means 50. Likewise, Power In Pad #P 21 is connected to the power input of Power Gate #P 61 via connection means 31. The power output of Power Gate #P 61 is connected to Power In Net #P 41 via connection means 51.

I/O Pad #1 22 is connected to the signal input terminal of I/O Switch #1 62 via connection means 32. The signal output terminal of I/O Switch #1 62 is connected to I/O Net #1 42 via connection means 52. Likewise, I/O Pad #K 23 is connected to the signal input terminal of I/O Switch #K 63 via connection means 33. The signal output terminal of I/O Switch #K 63 is connected to I/O Net #K 43 via connection means 53.

Power Control Pad 26 is connected to the control input terminals on Power Gate #1 60 thru Power Gate #P 61, and I/O Switch #1 62 thru I/O Switch #K 63 via connection means 36.

Neutral Pad #1 24 is connected to Neutral Net #1 44 via connection means 34. Neutral Pad #N 25 is connected to Neutral Net #N 45 via connection means 35.

Operation of the First Variation of the First Embodiment

Power Gate #1 60 thru Power Gate #P 61 serve as electronically controlled, low impedance power switching means capable of transporting the current used by the loads presented by Power In Net #1 40 thru Power In Net #P 41 respectively. Likewise, I/O Switch #1 62 thru I/O Switch 63 serve as electronically controlled, low impedance signal switches for transporting electrical signals used by I/O Net #1 42 thru I/O Net #K respectively.

When the control input terminal of any power gate is asserted, the power gate presents a low impedance from its power input terminal to its power output terminal. Similarly, when the control input terminal of any I/O switch is asserted, the I/O switch presents a low impedance from its signal input terminal to its signal output terminal.

When the control input terminal of any power gate is deasserted, the power gate presents a high impedance from its power input terminal to its power output terminal. Similarly, when the control input terminal of any I/O switch is deasserted, the I/O switch presents a high impedance from its signal input terminal to its signal output terminal.

The first variation of the first embodiment of the present invention may operate in either of two conditions defined below. The operational condition of the first variation of the first embodiment of the present invention is dependent upon the state of the signal present on Power Control Pad 20.

Condition 1:

A voltage capable of asserting the control input terminals of Power Gate #1 60 thru Power Gate #P 61, and I/O Switch #1 62 thru I/O Switch #K 63 is applied to Power Control Pad 26 by an external agent (not shown). This voltage is transported to the control input terminals of Power Gate #1 60 thru Power Gate #P 61, and I/O Switch #1 62 thru I/O Switch #K 63 by connection means 36. The devices, Power Gate #1 60 thru Power Gate #P 61, and I/O Switch #1 62 thru I/O Switch #K 63, then enter the asserted state.

Electrical power from a power source (not shown) which is connected to Power In Pad #1 20 is transported from Power In Pad #1 20 to the power input terminal of Power Gate #1 60 via connection means 30, thru the low impedance then attained by the switching means contained in Power Gate #1 60, to the power output terminal of Power Gate #1 60, and via connection means 50 to Power In Net #1 40 where it enters Functional Circuit 99. Functional Circuit 99 then performs those electrical functions for which it is designed when using power available from Power In Net #1 40. Similarly, electrical power from a power source (not shown) which is connected to Power In Pad #P 21 is transported from Power In Pad #P 21 to the power input terminal of Power Gate #P 61 via connection means 31, thru the low impedance then attained by the switching means contained in Power Gate #P 61, to the power output terminal of Power Gate #P 61, and via connection means 51 to Power In Net #P 41 where it enters Functional Circuit 99. Functional Circuit 99 then performs those electrical functions for which it is designed when using power available from Power In Net #P 41.

An electrical signal from a signal source (not shown) which is connected to I/O Pad #1 22 is transported from I/O Pad #1 22 to the signal input terminal of I/O Switch #1 62 via connection means 32, thru the low impedance then attained by the switching means contained in I/O Switch #1 62, to the signal output terminal of I/O Switch #1 62, and via connection means 52 to I/O Net #1 42 where it enters Functional Circuit 99. Functional Circuit 99 then performs those electrical functions for which it is designed when using signals available from I/O Net #1 42. Similarly, an electrical signal from a signal source (not shown) which is connected to I/O Pad #K 23 is transported from I/O Pad #K 23 to the signal input terminal of I/O Switch #K 63 via connection means 33, thru the low impedance then attained by the switching means contained in I/O Switch #K 63, to the signal output terminal of I/O Switch #K 63, and via connection means 53 to I/O Net #K 43 where it enters Functional Circuit 99. Functional Circuit 99 then performs those electrical functions for which it is designed when using signals available from I/O Net #K 43.

Electrical and signal power used by Functional Circuit 99 is returned to Neutral Pad #1 24 thru Neutral Pad #N 25 from Neutral Net #1 44 thru Neutral Net #N 45 via connection means 34 and connection means 35 respectively.

Condition 2:

A voltage capable of deasserting the control input terminals of Power Gate #1 60 thru Power Gate #P 61, and I/O Switch #1 62 thru I/O Switch #K 63 is applied to Power Control Pad 26 by an external agent (not shown). This voltage is transported to the control input terminals of Power Gate #1 60 thru Power Gate #P 61, and I/O Switch #1 62 thru I/O Switch #K 63 by connection means 36. The devices, Power Gate #1 60 thru Power Gate #P 61, and I/O Switch #1 62 thru I/O Switch #K 63, then enter the deasserted state.

Electrical power from a power source (not shown) which is connected to Power In Pad #1 20 is transported from Power In Pad #1 20 to the power input terminal of Power Gate #1 60 via connection means 30. The switching means contained in Power Gate #1 60, having attained a very high impedance relative to the impedance of Power In Net #1 40 to Neutral Net #1 44, impedes the passage of power to the power output terminal of Power Gate #1 60 and thus substantially no power enters Power In Net #1 40 via connection means 50. Substantially no power enters Functional Circuit 99 having its source from Power In Pad #1 20. Similarly, electrical power from a power source (not shown) which is connected to Power In Pad #P 21 is transported from Power In Pad #P 21 to the power input terminal of Power Gate #P 61 via connection means 31. The switching means contained in Power Gate #P 61, having attained a very high impedance relative to the impedance of Power In Net #P 41 to Neutral Net #P 45, impedes the passage of power to the power output terminal of Power Gate #P 61 and thus substantially no power enters Power In Net #P 41 via connection means 51. Substantially no power enters Functional Circuit 99 having its source from Power In Pad #P 21.

An electrical signal from a signal source (not shown) which is connected to I/O Pad #1 22 is transported from I/O Pad #1 22 to the signal input terminal of I/O Switch #1 62 via connection means 32. The switching means contained in I/O Switch #1 62, having attained a very high impedance relative to the impedance of I/O Net #1 42 to Neutral Net #1 44, impedes the passage of any electrical signal to the signal output terminal of I/O Switch #1 62 and thus substantially no electrical signal enters I/O Net #1 42 via connection means 52. Substantially no signal enters Functional Circuit 99 having its source from I/O Pad #1 22. Similarly, an electrical signal from a signal source (not shown) which is connected to I/O Pad #K 23 is transported from I/O Pad #K 23 to the signal input terminal of I/O Switch #K 63 via connection means 33. The switching means contained in I/O Switch #K 63, having attained a very high impedance relative to the impedance of I/O Net #K 43 to Neutral Net #N 45, impedes the passage of any electrical signal to the signal output terminal of I/O Switch #K 63 and thus substantially no electrical signal enters I/O Net #K 43 via connection means 53. Substantially no signal enters Functional Circuit 99 having its source from I/O Pad #K 23.

Second Variation of the First Embodiment of the Invention

Construction of the Second Variation of the First Embodiment

The second variation of the first embodiment of the present invention creates a new Integrated Circuit 202, and is shown in FIG. 3. The construction of this variation of the first embodiment is identical to that shown for the first version of the first embodiment except the circuitry below has been added or deleted as noted.

1) connection means 36 is eliminated.
2) Buffer 64 has been added.
3) Power Control Pad 26 is connected to the signal input terminal of Buffer 64 via connection means 38.
4) The output of Buffer 64 is connected to the control input terminals on Power Gate #1 60 thru Power Gate #P 61, and I/O Switch #1 62 thru I/O Switch #K 63 via connection means 37.
5) the new substrate used is shown as Integrated Circuit Substrate 102.

Operation of the Second Variation of the First Embodiment

The second variation of the first embodiment of the present invention is operated identically to the first variation of the first embodiment of the present invention except as it relates to the addition of Buffer 64:

1) Power control signals entering at Power Control Pad 26 are now transferred to the signal input terminal of Buffer 64. The signal output terminal of Buffer 64 follows the signal input of Buffer 64 and is capable of driving all of the signal loads presented by the input terminals of Power Gate #1 60 thru Power Gate #P 61, and I/O Switch #1 62 thru I/O Switch #K 63. Power control signals exiting the signal output terminal of Buffer 64 enter the control input terminals of Power Gate #1 60 thru Power Gate #P 61, and I/O Switch #1 62 thru I/O Switch #K 63. This signal is interpreted as asserted or deasserted by these devices as defined under "Operation of the First Variation of the First Embodiment," above.

Third Variation of the First Embodiment of the Invention

Construction of the Third Variation of the First Embodiment

The third variation of the first embodiment of the present invention creates a new Integrated Circuit 203, and is shown in FIG. 4. The construction of this variation of the first embodiment is identical to that shown for the first variation of the first embodiment except:

1) connection means 36 is eliminated.
2) Power Control Pad 26 is connected to the signal input terminal of Sequencer 65 via connection means 67.
3) Sequencer 65 has two output terminals: a power gate control output terminal and a I/O switch control output terminal. The power gate control output terminal of Sequencer 65 is connected to the control input terminals on Power Gate #1 60 thru Power Gate #P 61 via connection means 68. The I/O switch control output terminal of Sequencer 65 is connected to the control input terminals on I/O Switch #1 62 thru I/O Switch #K 63 via connection means 69.
4) the new substrate used is shown as Integrated Circuit Substrate 103.

Operation of the Third Variation of the First Embodiment

The third variation of the first embodiment of the present invention is operated identically to the first variation of the first embodiment of the present invention except as it relates to the addition of Sequencer 65:

1) Power control signals entering at Power Control Pad 26 are now transferred to the signal input terminal of Sequencer 65.

2) Sequencer 65 is a means for controlling the relative time relationship of changes in the state of the power gate control output terminal and the I/O switch control output terminal as follows:

a) Assertion of the signal input terminal of Sequencer 65 first causes the assertion of the power gate control output terminal of Sequencer 65. This asserted output terminal is connected to the control input terminals of Power Gate #1 60 thru Power Gate #P 61 via connection means 68. As described in "Operation of the First Variation of the First Embodiment," above, power is passed into Power In Net #1 40 thru Power In Net #P 41.

Secondly, the Sequencer 65 causes the assertion of the I/O switch control output terminal of Sequencer 65. This asserted output terminal is connected to the control input terminals of I/O Switch #1 62 thru I/O Switch #K 63 via connection means 69. I/O Switch #1 62 thru I/O Switch #K 63 then operate in the asserted mode as described in "Operation of the First Embodiment," above.

The time between the assertion of the control input terminals of Power Gate #1 60 thru Power Gate #P 61 and the control input terminals of I/O Switch #1 62 thru I/O Switch #K 63 is sufficient (order of nanoseconds) to allow the power to stabilize in Functional Circuit 99 prior to the connection of the I/O pads to the I/O nets of Functional Circuit 99.

b) Deassertion of the signal input terminal of Sequencer 65 first causes the deassertion of the I/O switch control output terminal of Sequencer 65. This deasserted output terminal is connected to the control input terminals of I/O Switch #1 62 thru I/O Switch #K 63 via connection means 69. I/O Switch #1 62 thru I/O Switch #K 63 then operate in the deasserted mode as described in "Operation of the First Embodiment," above.

Secondly, the Sequencer 65 causes the aleassertion of the power gate control output terminal of Sequencer 65. This deasserted output terminal is connected to the control input terminals of Power Gate #1 60 thru Power Gate #P 61 via connection means 68. As described in "Operation of the First Embodiment," above, power is blocked from passing into Power In Net #1 40 thru Power In Net #P 41.

The time between the deassertion of the control input terminals of I/O Switch #1 62 thru I/O Switch #K 63 and the control input terminals of Power Gate #1 60 thru Power Gate #P 61 is sufficient (order of nanoseconds) to allow the I/O pads to be isolated from the I/O nets of Functional Circuit 99 before power is disconnected from Functional Circuit 99.

Second Embodiment of the Invention

Purpose of the Second Embodiment of the Invention

Figure 5:
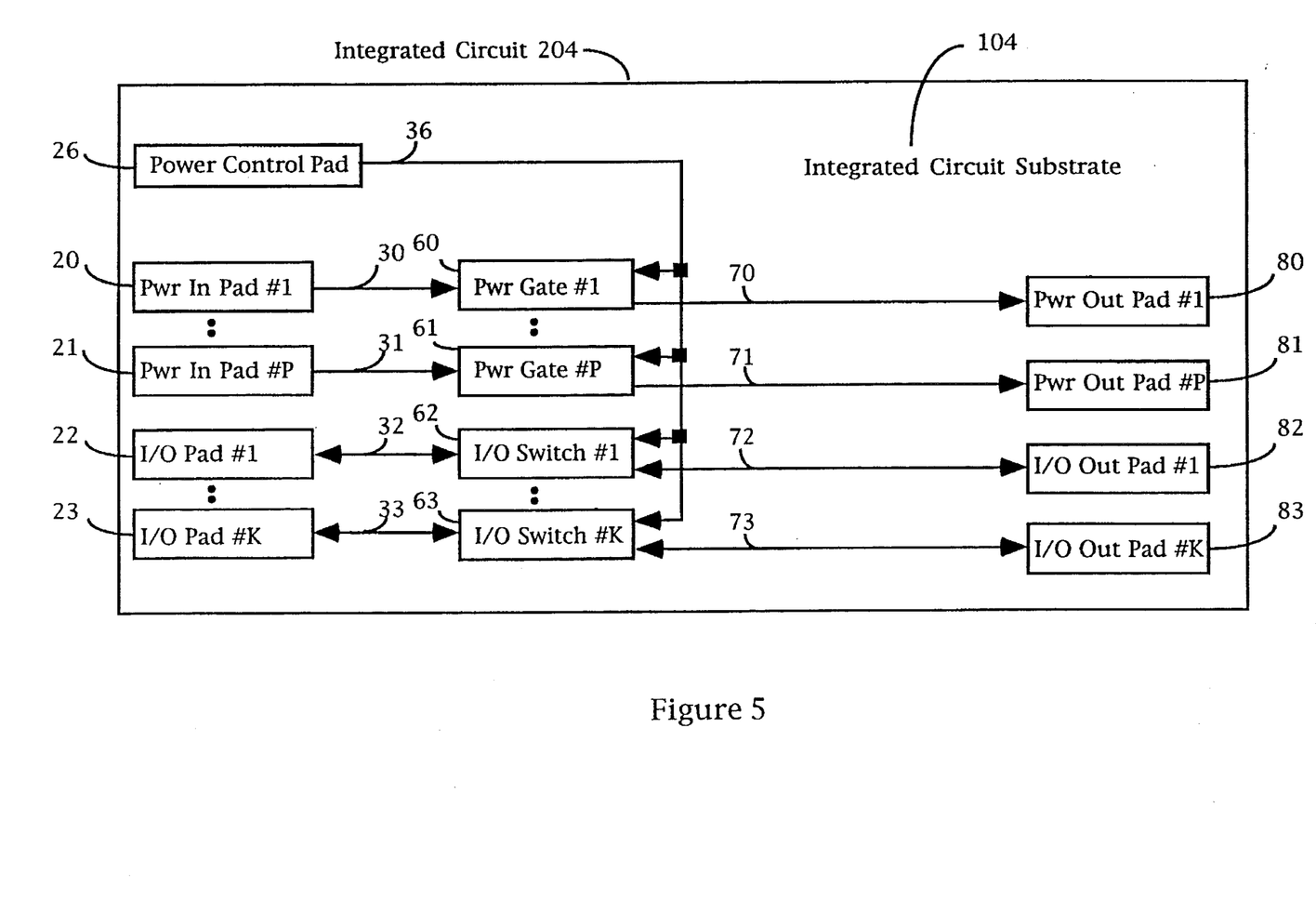
FIG. 5 shows a power gate means, combined with a I/O switch means, and an integrated circuit substrate to form the first variation of the second embodiment of the PMA.
Figure 6:
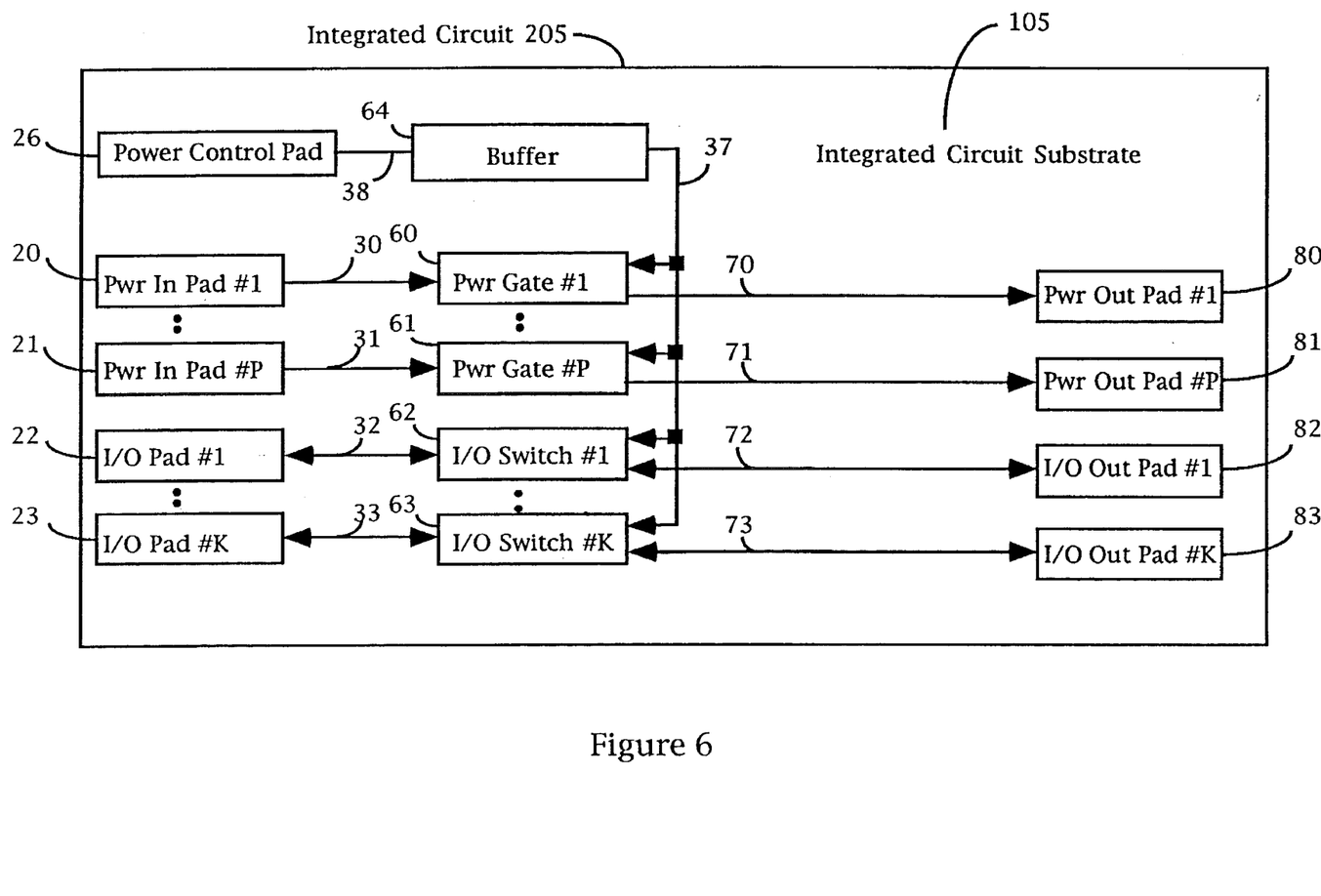
FIG. 6 shows a power gate means, combined with a I/O switch means, a buffer means, and an integrated circuit substrate to form the second variation of the second embodiment of the PMA.
Figure 7:
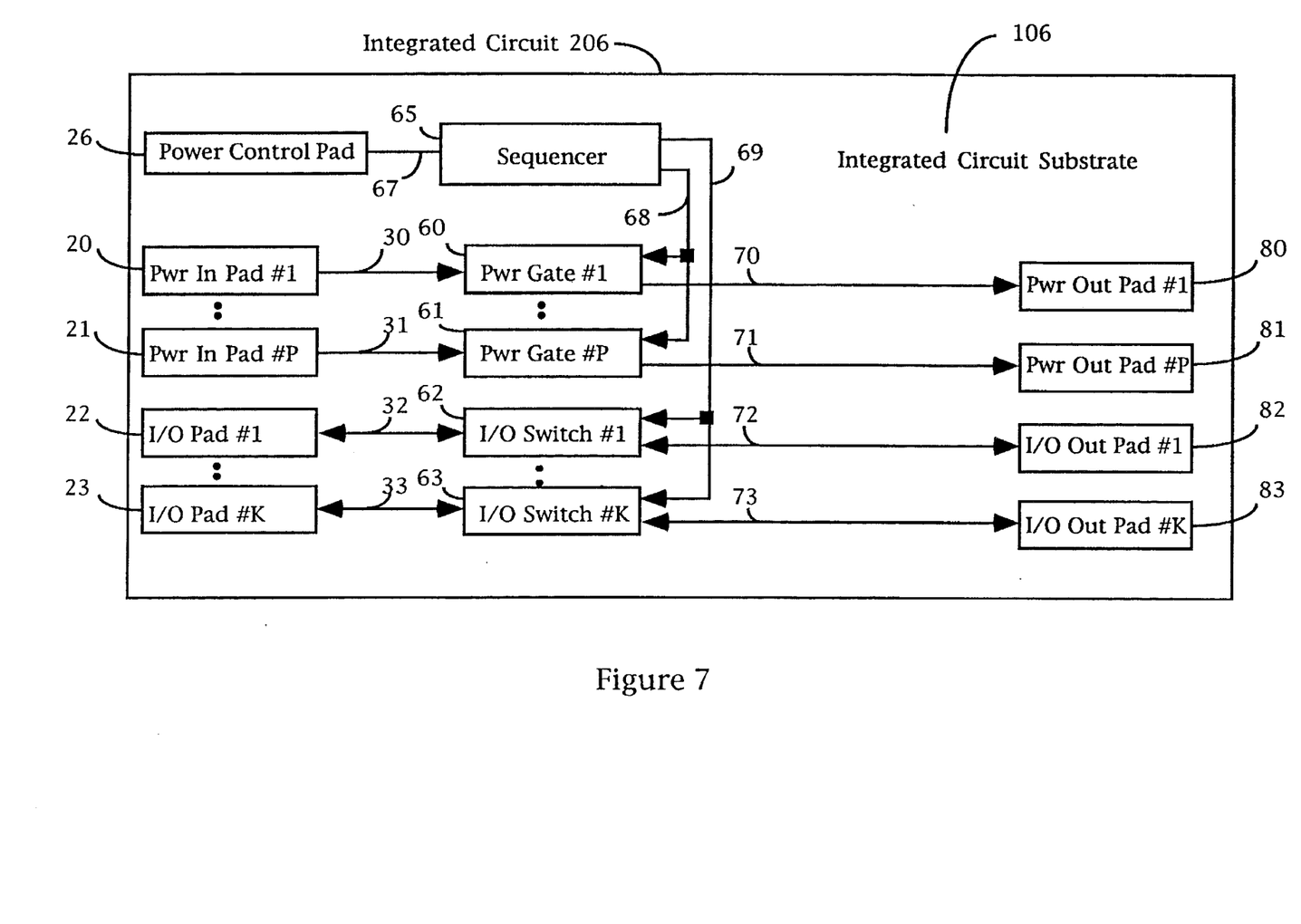
FIG. 7 shows a power gate means, combined with a I/O switch means, a sequencer means, and an integrated circuit substrate to form the third variation of the first embodiment of the PMA.

This second embodiment of the present invention combines power gates, I/O switches, buffer functions, and an integrated circuit substrate in various ways to create three new integrated circuits numbered 204, 205, and 206 in FIGS. 5–7 respectively. These three variations are used in conjunction with a functional circuit contained in a separate chip. Various connection means are employed to connect the PMA combined with a chip or socket with a functional circuit contained in a separate chip.

These three variations to this embodiment differ only by the means by which the power control signal is applied to the power gate and I/O switch control inputs. This embodiment differs from the first embodiment in that no combination includes Functional Circuit 99. These new integrated circuits may be combined with one of several mechanical packaging means defined under "Packaging of the Second Embodiment," below and used in-circuit with existing technology.

Note to the Examiner: As declared above, both the power gate and the I/O switch are a "switching means." The inventors have deliberately maintained a nomenclature difference between "power gate" and "I/O switch" in this application as a continuous reminder that there is a substantial difference between the function of the two devices, even though both function, fundamentally, as an electronic switch. The former is used to transfer power from the input terminal to the output terminal with little loss. The latter is used to transfer signals from the input terminal to the output terminal with high fidelity. The function, construction and use of the two electronic switch types is radically different in this invention. In the first and second variations of the second embodiment below, it is this difference that creates the novelty over prior art. Where the invention is used without combination with a functional circuit, these variations have an analog in the prior art in that integrated circuits can be found on the market which contain a plurality of switches. We believe, however, that all of the switches provided on these integrated circuits are identical on any particular device. We also believe that no prior art can be found wherein a particular integrated circuit contains switches intended for power transfer and switches intended for signal transfer on the same substrate. Therein lays the difference. Further, when these are used in combination with a socket, a truly unique device has been invented.

First Variation of the Second Embodiment of the Invention

Construction of the First Variation of the Second Embodiment

The first variation of the second embodiment of the present invention creates a new Integrated Circuit 204, and is shown in FIG. 5. The integrated circuit defined for the first variation of the first embodiment of the present invention is shown with Functional Circuit 99 deleted. Connection means 50, connection means 51, connection means 52, and connection means 53 which connected the power gates and the I/O switches to Functional Circuit 99 have also been removed. Power output pads and I/O switch output signal pads are added as described below. The new substrate used is shown as Integrated Circuit Substrate 104.

The added circuitry is:

1) Power Out Pad #1 80 is connected to the power output terminal of Power Gate #1 60 via connection means 70.

2) Power Out Pad #P 81 is connected to the power output terminal of Power Gate #P 61 via connection means 71.

3) I/O Out Pad #1 82 is connected to the signal output terminal of I/O Switch #1 62 via connection means 72.

4) I/O Out Pad #K 83 is connected to the signal output terminal of I/O Switch #K 63 via connection means 73.

Operation of the First Variation of the Second Embodiment

Operation of the first variation of the second embodiment is identical to the operation of the first variation of the first embodiment except as it relates to the power output terminal of Power Gate #1 60, the power output terminal of Power Gate #P 61, the signal output terminal of I/O Switch #1 62, and the signal output terminal of I/O Switch #K 63. These output terminals were connected to nets in Functional Circuit 99 and are now brought out to pads on Integrated Circuit Substrate 104. Power available at the power output terminal of Power Gate #1 60 is transferred to Power Out Pad #1 80 via connection means 70. Power available at the power output terminal of Power Gate #P 61 is transferred to Power Out Pad #P 81 via connection means 71. Signal available at the signal output terminal of I/O Switch #1 62 is transferred to I/O Out Pad #1 82 via connection means 72. Signal available at the signal output terminal of I/O Switch #K 63 is transferred to I/O Out Pad #K 83 via connection means 73.

Second Variation of the Second Embodiment of the Invention

Construction of the Second Variation of the Second Embodiment

The second variation of the second embodiment of the present invention creates a new Integrated Circuit 205, and is shown in FIG. 6. The integrated circuit defined for the second variation of the first embodiment of the present invention is shown with Functional Circuit 99 deleted. Connection means 50, connection means 51, connection means 52, and connection means 53 which connected the power gates and the I/O switches to Functional Circuit 99 have also been removed. Power output pads and I/O switch output signal pads are added as described below. The new substrate thus created is shown as Integrated Circuit Substrate 105.

The added circuitry is:

1) Power Out Pad #1 80 is connected to the power output terminal of Power Gate #1 60 via connection means 70.
2) Power Out Pad #P 81 is connected to the power output terminal of Power Gate #P 61 via connection means 71.
3) I/O Out Pad #1 82 is connected to the signal output terminal of I/O Switch #1 62 via connection means 72.
4) I/O Out Pad #K 83 is connected to the signal output terminal of I/O Switch #K 63 via connection means 73.

Operation of the Second Variation of the Second Embodiment

Operation of the second variation of the second embodiment is identical to the operation of the second variation of the first embodiment except as it relates to the power output terminal of Power Gate #1 60, the power output terminal of Power Gate #P 61, the signal output terminal of I/O Switch #1 62, and the signal output terminal of I/O Switch #K 63. These output terminals were connected to nets in Functional Circuit 99 and are now brought out to pads on Integrated Circuit Substrate 104. Power available at the power output terminal of Power Gate #1 60 is transferred to Power Out Pad #1 80 via connection means 70. Power available at the power output terminal of Power Gate #P 61 is transferred to Power Out Pad #P 81 via connection means 71. Signal available at the signal output terminal of I/O Switch #1 62 is transferred to I/O Out Pad #1 82 via connection means 72. Signal available at the signal output terminal of I/O Switch #K 63 is transferred to I/O Out Pad #K 83 via connection means 73.

Third Variation of the Second Embodiment of the Invention

Construction of the Third Variation of the Second Embodiment

The third variation of the second embodiment of the present invention creates a new Integrated Circuit 206, and is shown in FIG. 7. The integrated circuit defined for the third variation of the first embodiment of the present invention is shown with Functional Circuit 99 deleted. Connection means 50, connection means 51, connection means 52, and connection means 53 which connected the power gates and the I/O switches to Functional Circuit 99 have also been removed. Power output pads and I/O switch output signal pads are added as described below. The new substrate thus created is shown as Integrated Circuit Substrate 105.

The added circuitry is:

1) Power Out Pad #1 80 is connected to the power output terminal of Power Gate #1 60 via connection means 70.
2) Power Out Pad #P 81 is connected to the power output terminal of Power Gate #P 61 via connection means 71.
3) I/O Out Pad #1 82 is connected to the signal output terminal of I/O Switch #1 62 via connection means 72.
4) I/O Out Pad #K 83 is connected to the signal output terminal of I/O Switch #K 63 via connection means 73.

Operation of the Third Variation of the Second Embodiment

Operation of the third variation of the second embodiment is identical to the operation of the third variation of the first embodiment except as it relates to the power output terminal of Power Gate #1 60, the power output terminal of Power Gate #P 61, the signal output terminal of I/O Switch #1 62, and the signal output terminal of I/O Switch #K 63. These output terminals were connected to nets in Functional Circuit 99 and are now brought out to pads on Integrated Circuit Substrate 104. Power available at the power output tern final of Power Gate #1 60 is transferred to Power Out Pad #1 80 via connection means 70. Power available at the power output terminal of Power Gate #P 61 is transferred to Power Out Pad #P 81 via connection means 71. Signal available at the signal output terminal of I/O Switch #1 62 is transferred to I/O Out Pad #1 82 via connection means 72. Signal available at the signal output terminal of I/O Switch #K 63 is transferred to I/O Out Pad #K 83 via connection means 73.

Packaging of the Second Embodiment

Integrated Circuit 204, Integrated Circuit 205, or Integrated Circuit 206 can be combined with the elements of and incorporated into a chip or a socket. The number of power gates and I/O switches used in a specific instantiation of the second embodiment determine the number of pins on a given chip or socket. The chips thus created represent a new type of chip. Integrated Circuit 204, Integrated Circuit 205, or Integrated Circuit 206 can be combined with the elements of and incorporated into a socket to produce a new type of socket containing active elements.

Concluding Remarks

It should now be apparent to those skilled in the art that a novel method for managing the power used in an individual integrated circuit has been invented. The method provides for circuit anomalies which occur between interconnected powered-off and powered-on integrated circuits by providing for the effective isolation of the integrated circuit signal functions from external circuitry when the integrated circuit is powered-off.

It should also be apparent that the present invention provides electronic designers with a new and practical tool for controlling the power consumption of complex electronic devices.

It should be further apparent that the present invention creates two completely new families of electronic devices capable of preserving electrical power. The first family applies the invention to an existing, or to be developed, integrated circuit to create a new integrated circuit that has the original function in-place but with the power management function incorporated. The second new family, consisting of integrated circuit chips and sockets containing the PMA, allows the circuit designer to incorporate power management into circuit designs using available off-the-shelf technology.

It should be further apparent to those skilled in the art that various changes in the form and the details of the invention as shown and described may be made. It is intended that such changes be included within the spirit and scope of the claims appended hereto.

We claim:

1. A power management apparatus for regulating the use of electrical energy in an internal functional circuit, the power management apparatus comprising:

an integrated circuit substrate whereon 1) the internal functional circuit, 2) a power gating means, and 3) a switching means are constructed, wherein electrical power is controllably passed from an external power supply through the power gating means to the internal functional circuit, wherein one or more first electrical signals are controllably passed between an external functional circuit and the internal functional circuit via the switching means, and wherein a second externally generated electrical signal controls the coupling action in the power gating means via a first control input of the power gating means and further controls the coupling action in the switching means via a second control input of the switching means, wherein:

the integrated circuit substrate providing a means for constructing and interconnecting electrical circuits, the internal functional circuit for performing an electrical function, the power gating means for coupling power between said external power supply and the internal functional circuit in response to the assertion of said second externally generated electrical signal, and for uncoupling power between said external power supply and the internal functional circuit in response to the deassertion of said second externally generated electrical signal, the switching means for coupling said first electrical signals passed between the external functional circuit and the internal functional circuit in response to the assertion of said second externally generated electrical signal, and for uncoupling said first electrical signals passed between the external functional circuit and the internal functional circuit in response to the deassertion of said second externally generated electrical signal, the improvement allowing the management of power to be distributed and decentralized onto the individual integrated circuit substrate where the application of power is to be managed, and allowing submicrosecond recovery of internal functional circuit function upon the assertion of the second externally generated electrical signal.

2. The power management apparatus of claim 1 further including a buffering means constructed on the integrated circuit substrate for electrically isolating the second externally generated electrical signal from the first control input of the power gating means and the second control input of the switching means, said second externally generated electrical signal being passed through the buffering means to the first control input of the power gating means and to the second control input of the switching means.

3. The power management apparatus of claim 1 further including a sequencing means constructed on the integrated circuit substrate for controlling the relative time relationship of changes in the state of coupling in the power gating means and in the switching means, said second externally generated electrical signal being separated by the sequencing means into at least a third electrical signal passed from the sequencing means to the first control input of the power gating means and a fourth electrical signal passed from the sequencing means to the second control input of the switching means, wherein the time relationship of the assertion and deassertion of the third electrical signal and the fourth electrical signal is controlled by the sequencing means.

* * * * *